Patented May 29, 1945

2,376,998

UNITED STATES PATENT OFFICE 2,376,998

LIME FLUX AND METHOD OF MANUFACTURE

William J. Fulton, Los Angeles, Calif.

No Drawing. Application October 6, 1941,
Serial No. 413,907

6 Claims. (Cl. 75—55)

This invention relates to the art of preparing calcined lime for use as a flux in the manufacture of steel and other metals. My invention is of particular importance to the steel industry and will be described in connection therewith, although it will be understood that it is susceptible of other applications, and I do not intend to be limited to the particular use described.

In the steel making art it is standard practice in the use of an open-hearth or electric furnace to mix in with the pig iron or metal scrap in the furnace a predetermined quantity of high calcium calcined lime which aids in the formation and separation of slag from the steel. The high calcium calcined lime used must normally be of a high order of purity, and approaches in purity calcium oxide (CaO), and is normally required to be in the form of dense hard lumps graded within predetermined size limits. Such lumps ordinarily must be from one-half inch to two inches in diameter or cross section in their shortest dimension, and it has been found that for most steel manufacture lumps of approximately one and one-half inches in diameter are the most desirable size. Undersized lumps and dust are particularly undesirable as they normally result in an imperfect or delayed formation of slag in the furnace. Furthermore, undersized lumps and dust frequently percolate down through the mass of cool metal in the furnace, prior to melting thereof, to form a hard impervious coating of lime on the bottom walls of the furnace, which requires frequent cleaning of the furnace with the attendant loss in productivity thereof and the undesirable expense of such cleaning operations.

It has also been found in the manufacture of steel that it is very important to use fluxing lime which uniformly has a low water content and which has not been air-slaked to any substantial extent by contact with damp air. Since calcined lime rapidly slakes upon contact with moisture-laden air, it is extremely difficult for the lime manufacturers to supply and the steel manufacturers to obtain calcined lime having a uniformly low moisture content, due to natural delays between the time of manufacture of high calcium calcined lime and the time of use of such lime by the steel manufacturers.

In the manufacture of such lime to meet the rigid specifications of the steel manufacturers, the raw material, normally limestone, is first crushed to approximately the desired size specified above, it is then passed through the lime kiln, and the finished lime lumps must then be graded for size to separate them from the dust and chips formed as a result of their passage through the kiln. This grading process is expensive, and frequently the resulting dust and small chips must be discarded as waste because of lack of a market therefor. All of such factors make the finished cost of high calcium calcined high, and result in considerable waste of dust and lime suitable for steel manufacture relatively small chips which are chemically satisfactory for steel manufacture but do not meet size requirements therefor.

It is therefore a primary object of my invention to obviate the foregoing difficulties and disadvantages of the standard methods of manufacture of high calcium calcined lime for use as a steel flux, by treating the lime output of a lime kiln so that all of the output may be used for a steel flux, and so that the moisture content of such lime when delivered to the steel manufacturers will be approximately constant regardless of delays between manufacture and use.

To accomplish the foregoing object I prefer to crush limestone or other suitable raw material to a relatively small size, and then pass such crushed limestone through a lime kiln in the ordinary manner to produce a high calcium calcined lime approaching calcium oxide (CaO) in purity. The apparatus used for these first operations may be any standard crushing apparatus and lime kiln, as are well known in the art.

I prefer to mix the high calcium calcined lime produced from the lime kiln with a binder in a suitable mixing vat immediately after the lime is produced from the kiln, to prevent any tendency for the lime to deteriorate, although it will be understood that under some operating conditions this mixing may be delayed without danger of deterioration of the lime. As a binder, any hydrocarbon oil or residue may be used, providing it is relatively free from impurities such as sulphur, sulphur compounds, or the like, and providing further that it is of sufficiently low viscosity to insure that it will, during mixing with the lime, substantially impregnate and cover each particle of the lime. I prefer to use such a hydrocarbon oil as a binder because on being exposed to the relatively high temperatures of a steel furnace it will reduce to substantially pure carbon which does not affect the quality of the steel or the formation of the slag. Obviously, other binders having these qualities may be used without departing from the spirit of my invention. If a hydrocarbon oil is used as a binder, the sulphur and sulphur compound content thereof should preferably be less than 2% by weight of the oil used, i. e., relatively free from sulphur.

In mixing a binder, such as hydrocarbon oil, with the calcined lime, I have found that only a relatively small quantity of oil is necessary to effect my desired result. Normally, only one-half barrel of oil per ton of lime is necessary, although any desired amount may be used as desired. The mixing is continued until the binder is thoroughly dispersed throughout the lime, at which time the mixing operation is complete.

The mixture of lime and the binder is then fed by suitable means to a briquetting machine which may be of any suitable form known in the art, in which the mixture is compressed into individual lumps of the desired size. As indicated above, for use as a steel flux, the compressed lumps should preferably be between one-half inch and two inchs in diameter in their shortest dimension, and are preferably made to average approximately one and one-half inches in diameter in their shortest dimension. The compressed lumps, however, may be made in any desired shape or size without departing from the spirit of my invention.

In the manufacture of the compressed lumps, it is important to apply enough pressure by means of the briquetting machine to form a compressed lump having a relatively high degree of hardness, to prevent breakage in transit and handling. The compressing or briquetting pressure required for any particular calcined lime will depend upon the physical characteristics of the lime used and the varying demands of particular steel manufacturers. With certain limes it may be necessary to use briquetting pressures of fifteen tons per square inch to produce a compressed lump of required hardness for a particular use, whereas with other limes it may only require a briquetting pressure of five tons per square inch or less to produce a compressed lump of satisfactory quality.

The binder mixed with the lime serves to act as a bond between the lime particles so that when compressed the resulting compressed lumps will be extremely hard and durable and will not tend to break or chip during handling. The binder also serves to coat the lime particles so as to render them substantially impervious to absorption of moisture from the air. Consequently, I have found that such compressed lumps of lime will not tend to air-slake to any substantial degree between the time of manufacture and the time of use, even though a considerable time interval occurs between these operations. However, if long storage or transit is necessary, it is sometimes desirable to provide additional protection against breaking and chipping and such air-slaking by dipping or coating the compressed lumps in a suitable coating material, such as hydrocarbon oil, tar, asphalt, or the like. Such a coating material, however, must be substantially free of sulphur and other impurities deleterious to steel manufacture. By the use of such a coating material on my compressed lumps of lime, I have found that the lumps may be stored for a number of months with no appreciable air-slaking due to absorption of moisture from the air and may be handled extensively without substantial breakage.

Whether or not the compressed lumps are subjected to this additional coating step, under ordinary circumstances of manufacture, delivery, and use, the lumps will be found to provide to the steel manufacturer a fluxing lime in a convenient form for handling which has a substantially uniform moisture content, a result heretofore practically impossible in the industry, and which is sufficiently hard to prevent substantial breakage. Furthermore, since the entire output of the lime kiln, including lime dust and the normally undersized lime lumps, is mixed with the binder and briquetted, there is no waste to the lime manufacturer, which effects a substantial economy in the manufacture and supplying of such a fluxing lime.

Although I prefer to form such compressed lime lumps by first mixing the lime particles with a binder and then briquetting the mixture, as described hereinabove, I have found that with certain calcined limes the addition of a binder prior to briquetting is unnecessary and may be omitted. Consequently, in the use of such limes I merely briquet the lime particles to form a hard compressed lump of calcined lime, which lump may or may not be coated with a coating material as described, depending upon the requirements for shipping and handling. I have been able to thus form such compressed lime lumps which are satisfactory for use as a flux in steel-making, and I do not desire to be limited or restricted to the use of a binder with the lime particles prior to briquetting, although, as indicated, the addition of such a binder will produce superior results with most high calcium calcined limes.

It is also to be noted that many types of calcined limes are chemically suitable for use as a steel flux but are either too soft or friable to be used with present methods of the art due to the propensity of the particles and lumps thereof to crumble, break, and form dust. Such lime may be readily briquetted by my method set forth hereinabove to provide a compressed lime lump which is sufficiently hard to be used for a steel fluxing lime in a steel furnace, thus making available for use for steel fluxing many sources of lime which have hitherto been unable to provide a fluxing lime of the required characteristics. Thus, the use of my invention will open up a new market for many lime manufacturers and will increase substantially the supply of lime available for steel fluxing by converting hitherto unsuitable limes into a form acceptable for such use.

Although I have described a preferred embodiment of my invention, it will be appreciated by those skilled in the art that changes may be made therein as required under particular operating conditions without departing from the spirit of my invention, and, consequently, I do not intend to be in any way limited by the foregoing description but desire to be afforded the full scope of the following claims.

I claim as my invention:

1. A method of making a fluxing lime, including the steps of: reducing a high calcium calcined lime to relatively small particles; mixing said particles with a liquid hydrocarbon binder adapted to prevent air-slaking of the lime; compressing a predetermined quantity of such mixture under relatively high pressure to form thereof a compressed lump of predetermined shape and size; and coating said lump with said binder.

2. A method of making a fluxing lime, including the steps of: reducing a high calcium calcined lime to relatively small particles; mixing said particles with a binder; compressing a predetermined quantity of such mixture under relatively high pressure to form thereof a compressed lump of predetermined shape and size; and coating said lump with a material adapted to prevent air-slaking of the lime thereof.

3. A method of making a steel fluxing lime, including the steps of: reducing a high calcium calcined lime to relatively small particles; compressing a predetermined quantity of said lime particles under relatively high pressure to form thereof a compressed lump of predetermined size and shape; and coating said lump with a material adapted to prevent air-slaking of the lime thereof.

4. A method of making a steel fluxing lime, including the steps of: reducing a high calcium calcined lime to relatively small particles; compressing a predetermined quantity of said lime particles under relatively high pressure to form thereof a compressed lump of predetermined size and shape; and coating said lump with a hydrocarbon material relatively free of sulphur and sulphur compounds.

5. As an article of manufacture, a compressed lump formed of high calcium calcined lime compressed under relatively high pressure to form a hard compressed lump, the compressed lump being surface-coated with a material adapted to prevent air-slaking of the lime thereof.

6. As an article of manufacture, a compressed lump formed of high calcium calcined lime mixed with a binder and the mixture compressed under relatively high pressure to form a hard compressed lump, the compressed lump being surface-coated with a material adapted to prevent air-slaking of the lime thereof.

WILLIAM J. FULTON.